United States Patent
Hinz et al.

[11] Patent Number: 6,025,854
[45] Date of Patent: Feb. 15, 2000

[54] METHOD AND APPARATUS FOR HIGH SPEED IMAGE ACQUISITION

[75] Inventors: Robert C. Hinz, West Linn; Steven J. Olson, Portland; Kurt M. Anderson, Molalla, all of Oreg.

[73] Assignee: Cognex Corporation, Natick, Mass.

[21] Appl. No.: 09/002,264

[22] Filed: Dec. 31, 1997

[51] Int. Cl.[7] .................................................. G06F 13/00
[52] U.S. Cl. .......................................... 345/511; 345/513
[58] Field of Search .................................... 345/511, 508, 345/513, 501, 507, 509, 515, 517, 521

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |

(List continued on next page.)

FOREIGN PATENT DOCUMENTS

0 527 632 A2  2/1993  European Pat. Off. .

*Primary Examiner*—Kee M. Tung
*Attorney, Agent, or Firm*—David J. Powsner

[57] ABSTRACT

The invention provides methods and systems for forming and image from a stream of non-interleaved image date, e.g., a stream of non-contiguous rows of pixels. Such a system includes a memory, in which the image is to be formed (and stored), and a controller, for initiating memory transfers that move rows of pixels from the stream to their (the rows') respective locations in memory. The controller initiates those transfers such that (i) the rows of pixels are transferred to the memory in the order in which they are received from the stream, and (ii) each row of pixels is transferred directly to the location in memory corresponding to that row's respective position in the image.

40 Claims, 3 Drawing Sheets

U.S. PATENT DOCUMENTS

| | | |
|---|---|---|
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,264,939 | 11/1993 | Chang ..................................... 348/322 |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |

METHOD AND APPARATUS FOR HIGH SPEED IMAGE ACQUISITION

BACKGROUND OF THE INVENTION

The invention pertains to digital image acquisition and, more particularly, to the high-speed formation of images from non-interleaved pixel data generated by video cameras and other image acquisition devices.

Digital images are usually stored, processed and displayed as pixel arrays grouped in rows and columns, generally, like the scenes that they represent. It would seem that video cameras and similar devices that generate those images must capture them in the same arrangement. That is often not the case.

Though the devices do generate images one row at a time, they do not generate them in contiguous order. Instead, they supply them in "non-interleaved form," generating odd-numbered rows (e.g., 1, 3, 5, . . . 479) in one batch, which is referred to as "field zero," and even-numbered rows (2,4,6 . . . 480) in another batch, which is referred to as "field one."

The fact that the pixel data is supplied in non-interleaved form presents a problem to designers of "frame grabbers" and other such specialized electronic circuits that transfer the data for storage, processing or display: the images must be reconstructed by interleaving the fields received from the acquisition devices. Thus, row one (from field 0) must be arranged before row two (from field 1); row three (from field 0), before row four (from field 1); and so on.

The timing of the acquisition devices presents an additional problem. Video cameras typically "march to their own drummers" and, more technically, to their own internal timing circuits. Once activated, the cameras generate an endless stream of pixels, one field at a time, synchronized with that timing. Frame grabbers, on the other hand, usually operate under the control of timing signals defined by the host computers to which they are attached. Rarely, does the timing of the camera circuitry match that of the host computer and frame grabber.

Accordingly, when a frame grabber begins capturing pixel data from a camera, typically, in response to a command issued by the host computer, neither the host nor the frame grabber knows which field the camera will be generating. Thus, the frame grabber must have the flexibility to interleave rows, beginning with pixel data from either field zero or field one.

There are two main approaches to solving these problems in use today. The first has the frame grabber acquiring the fields from the camera, storing them in interleaved format in an "on-board" video memory and, when acquisition is complete, transferring the full image to the host computer. In this configuration, the time required for a frame grabber to acquire both fields from the camera is only about 60 ms, for a 768×480 image. However, because of the limited bandwidth of the digital bus through which the frame grabber and host communicate, an additional 4 ms is required to move the interleaved image to the host computer memory. While this may not seem like a large amount of time, it nonetheless prevents the frame grabber from immediately refreshing its on-board buffer with a new image data from the camera. This effectively adds 16.7 ms to the repetitive image acquisition time, i.e., the time required to transfer successive images to the host computer memory. Although this can be improved by addition of a second on-board buffer, that adds to the cost and complexity of the circuitry.

A second pror art approach is to transfer the image data immediately as it is acquired from the camera. The advantage of this is that no additional time (or memory) is necessary for the frame grabber to hold that data while a transfer is on-going to the host computer. A disadvantage is that the host computer itself must interleave the data, thereby, consuming valuable processor and memory cycles. An additional disadvantage is that the host computer bus may be busy when the frame grabber begins a transfer to the host memory. As a result, portions of the image data may be lost. Though this can be remedied through use of a FIFO buffer at the output of the frame grabber, that buffer must be quite large—e.g., large enough to store an entire image—to guarantee against data loss.

In view of the foregoing, an object of the invention is to provide improved methods and apparatus for image acquisition and, more particularly, for forming and storing images from non-interleaved pixel data received from video cameras and other such image acquisition devices.

A related object of the invention is to provide such methods and apparatus as permit the interleaving and transfer of image data with minimal delay.

A still further object of the invention is to provide such method and apparatus as minimally tax host computer resources.

Yet still further aspects of the invention are to provide such methods and apparatus as permit image acquisition for minimum cost and maximum speed.

SUMMARY OF INVENTION

The above objects are among those attained by the invention, one aspect of which provides an improved system for forming an image in memory from a stream of non-interleaved image data, e.g., a stream of non-contiguous rows of pixels. Such a system comprises a memory, in which the image is to be formed (and stored), and a controller, for initiating memory transfers that move rows of pixels from the stream to their respective locations in the memory. The controller initiates those transfers such that (i) the rows of pixels are transferred to the memory in the order in which they are received from the stream, and (ii) each row of pixels is transferred directly to the location in memory corresponding to that row's respective position in the image.

By way of example, a system so described can be used to rapidly and efficiently construct an image in memory from a non-interleaved pixel stream generated by a video camera, e.g., a stream containing successive fields with image data for all odd- or even-numbered rows. As each row is received, the controller initiates a memory transfer for moving the pixels in that row to a location in memory corresponding to the row's respective position in the image. Thus, for example, if the image is to be stored beginning at row-address 101 of a memory array, the controller transfers the first odd-numbered row of pixels received from the stream to address 101 of the array; the next (odd-numbered) row to address 103 of the array; and so forth. When the first even-numbered row is received from the stream, the controller initiates its transfer to row-address 102 of the array; the next (even-numbered) row to address 104; and so forth. Through this unique method of operation, the system attains the advantage of rapid image construction, without the need for large temporary data stores or complicated circuitry.

Further aspects of the invention provide systems as described above in which the controller transfers rows of pixels received from the stream to the memory by direct memory access (DMA) transfers. To facilitate determining the target locations for those transfers, the system can have two tables specifying the locations in memory to which successive rows received from the stream are to be transferred. The first table, which is used if acquisition commences when the stream is transmitting odd-numbered rows (i.e., field zero), contains successive addresses for the memory locations that will be used to store odd-numbered rows, followed by successive addresses for the memory locations that will be used to store even-numbered rows. Such a table, for example, might be sequenced as follows: 101, 103, 105, . . . 199, 102, 104, 106, . . . 200. The second table, which is used if acquisition commences when the stream is transmitting even-numbered rows (i.e., field one), contains successive addresses for then even-numbered rows, followed by the odd-numbered rows. It might be sequenced like this: 102, 104, 106, . . . 200, 101, 103, 105, . . . 199. Such a table-driver approach is advantageous insofar as it permits targets for the controller-initiated DMA transfers to be generated at run-time.

Still further aspects of the invention provide improved image acquisition systems that operate in the manner of the systems described above. Systems according to these aspects of the invention include a first memory (e.g., a host computer memory) in which the image is to be formed; a second memory (e.g., a frame grabber buffer) for storing pixels in the order received from the stream; a bus for carrying pixels between the first and second memories; and, a controller for initiating memory transfers (e.g., DMA transfers) to move pixels between the first and second memories. As above, the controller initiates those transfers such that (i) the pixels are transferred substantially in the order received from the stream, and (ii) the pixels are transferred substantially directly to the locations in the first memory corresponding to their (the pixel's) respective positions in the image.

Such a system includes, according to further aspects of the invention, a third memory for at least temporarily storing pointers transferred from address tables of the type described above. That third memory can be, for example, a FIFO that resides on the same "side" of the bus as the second memory (e.g., an on-board buffer contained in a frame grabber). DMA or other transfer techniques can be used to move pointers from a host computer table to that FIFO buffer. Once the controller has used a pointer to initiate a row transfer between the first and second memories, that pointer can be discarded and a new one transferred from the table in its place.

Such an arrangement can be advantageously employed in a frame grabber that is plugged into the backplane of an image processing host computer. As discussed above, a first table in the memory of that host can store pointers to odd-numbered rows, followed by even-numbered rows of an image array. A second table can store pointers to even-numbered rows, followed by odd-numbered rows in that array. When image acquisition is commenced, the frame grabber can determine which table to use, depending on whether the stream currently contains the field zero rows or the field one rows of the image. Based on that determination, it can initiate a DMA transfer to move successive pointers from the chosen table to the third memory. Those pointers can, in turn, be used to initiate DMA transfers for moving pixels from the second memory to their respective locations in the first memory.

Still other aspects of the invention provide methods for constructing and storing a image from a non-interleaved stream paralleling the operation of the systems described above.

Methods and systems according to the invention have substantial application in industry and research. They facilitate the formation in memory of images from non-interleaved sources, to wit, conventional video cameras. Particularly, for example, they permit the construction of rapid, efficient and low-cost frame grabbers and other image acquisition equipment for use in machine vision and other image processing applications.

The foregoing and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
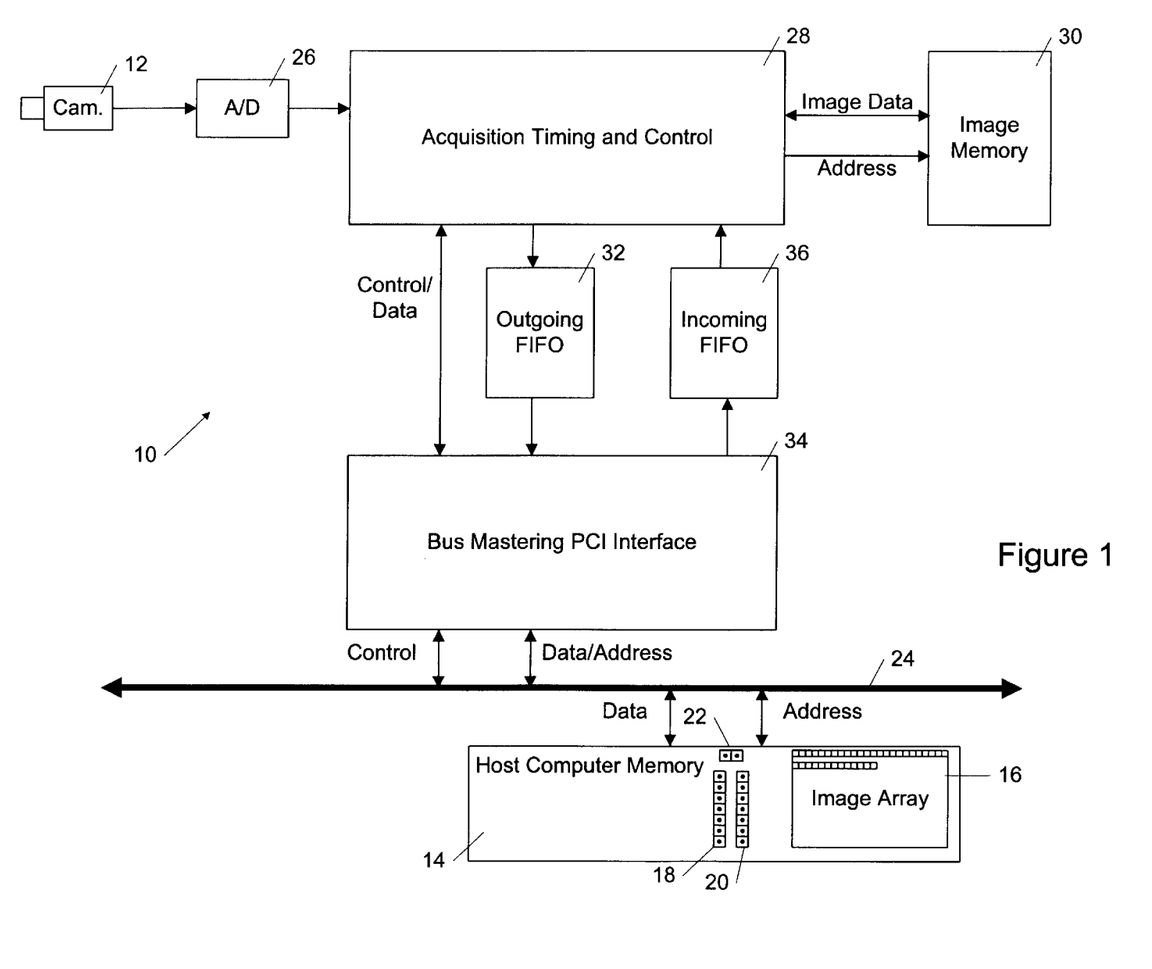
FIG. 1 depicts a system according to the invention for storing to a host computer memory an image derived from a stream of non-interleaved rows of pixels.

FIG. 1 depicts the hardware architecture of a system according to the invention for forming an image in memory from a stream of non-interleaved rows of pixels. The illustrated system includes a frame grabber 10 that receives the pixel stream from a video camera 12 and that forms the image in a host computer memory 14.

By way of overview, the illustrated system permits the simultaneous transfer and formation of the image in memory 14 by transferring its rows from the frame grabber 10 directly to their "final" addresses in the host memory, just as each row received from the camera 12. The system accomplishes this by, first, creating an image buffer or array 16 in the host system memory 14. The physical address of the beginning of each row is identified and two tables 18, 20 of pointers are created for the two possible field orderings: one in which field zero (the odd rows) precedes field one (the even rows); the other in which field one precedes field zero. Pointers 22 to these two tables are transferred to the frame grabber 10.

When image acquisition begins, the frame grabber 10 determines the field ordering from the camera 12 output and uses one of pointers 22 to initiate transfer of the appropriate table 18, 20 of row pointers. The incoming pixel stream is then transferred to the image array 16 one row at a time, using the selected table of pointers, into the array 16 so as to achieve the desired interleaving of the image data. Put another way, the frame grabber 10 transfers the rows of pixels received from the camera 12 to every other row of the array 16. This starts with odd or even rows—depending on which field is received from the camera 12 first—and proceeds to the even or odd rows, respectively.

The transfers of rows of pixels from frame grabber 10 to host memory 14 occurs during image acquisition. As pixel data becomes available, it is substantially immediately transferred to the host memory 14. Since the bandwidth of the bus 24 coupling the frame grabber 10 to the host memory 14 is typically so much greater than the stream rate from the camera 12, the image transfer is completed substantially simultaneously with the end of image acquisition by the camera 12.

With further reference to FIG. 1, camera 12 represents any image acquisition source that generates an output signal representing non-interleaved rows of an image. In the illustrated embodiment, that source is a conventional video camera, though other image acquisition devices may be used as well.

In the illustration, the output of camera 12 is routed to analog-to-digital converter 26. This converts the analog output from the camera 12 to a series of eight-bit digital pixels, in the conventional manner known in the art. A converter 26 is not required for image sources 12 whose output stream is generated directly in digital format.

Bus 24 represents a PCI bus, EISA bus, ISA bus, MCA bus or any other medium suitable for conveying digital signals between the frame grabber 10 and host computer memory 14. In a preferred embodiment, the frame grabber 10 is embodied on a printed circuit (PC) board that is inserted into a PCI adapter coupled to the backplane, or system bus, of a workstation or personal computer that serves as the host computer. Those skilled in the art will appreciate that other configurations may be utilized though, preferably, such configurations permit direct memory access (DMA) or other autonomous high speed transfers between the frame grabber 10 and memory 14.

Illustrated frame grabber 10 includes an Acquisition Timing and Control (hereinafter "timing") circuit 28 that is coupled to A/D converter 26 and on-board image memory 30, as illustrated. Timing circuit 28 takes the eight-bit pixel data from the A/D converter 26 and writes it into the image memory 30. Timing circuit 28 also transfers pixel data from the image memory 30 to outgoing FIFO 32. In addition, the Timing circuit 28 issues commands to the bus mastering PCI interface to transfer the selected pointer table 18, 20 from the host system memory 14 to the incoming FIFO 36, and to transfer pixel data in the outgoing FIFO 32 to the host system memory 14.

Illustrated bus mastering interface 34 serves as an interface between the frame grabber 10 and the host system computer (not shown) via the PCI bus 24. Specifically, the interface 34 controls DMA accesses to and from the host computer memory 14.

The illustrated components of frame grabber 10 are constructed from conventional components commercially available in the marketplace for like purpose. Those components are combined and operated in the manner described herein to provide the novel methods and apparatus of the invention.

Figure 2:
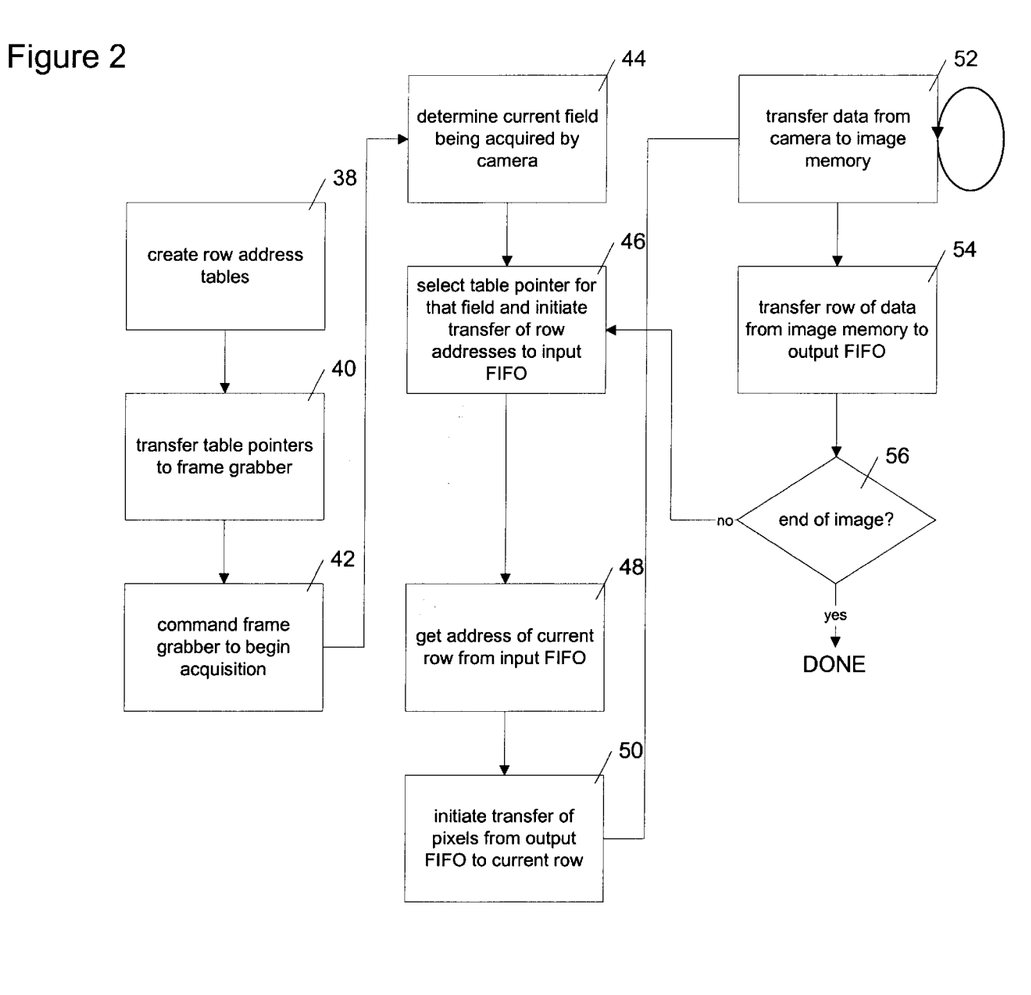
FIG. 2 depicts a method according to the invention for storing to a host computer memory an image derived from a stream of non-interleaved row of pixels.
Figure 3:
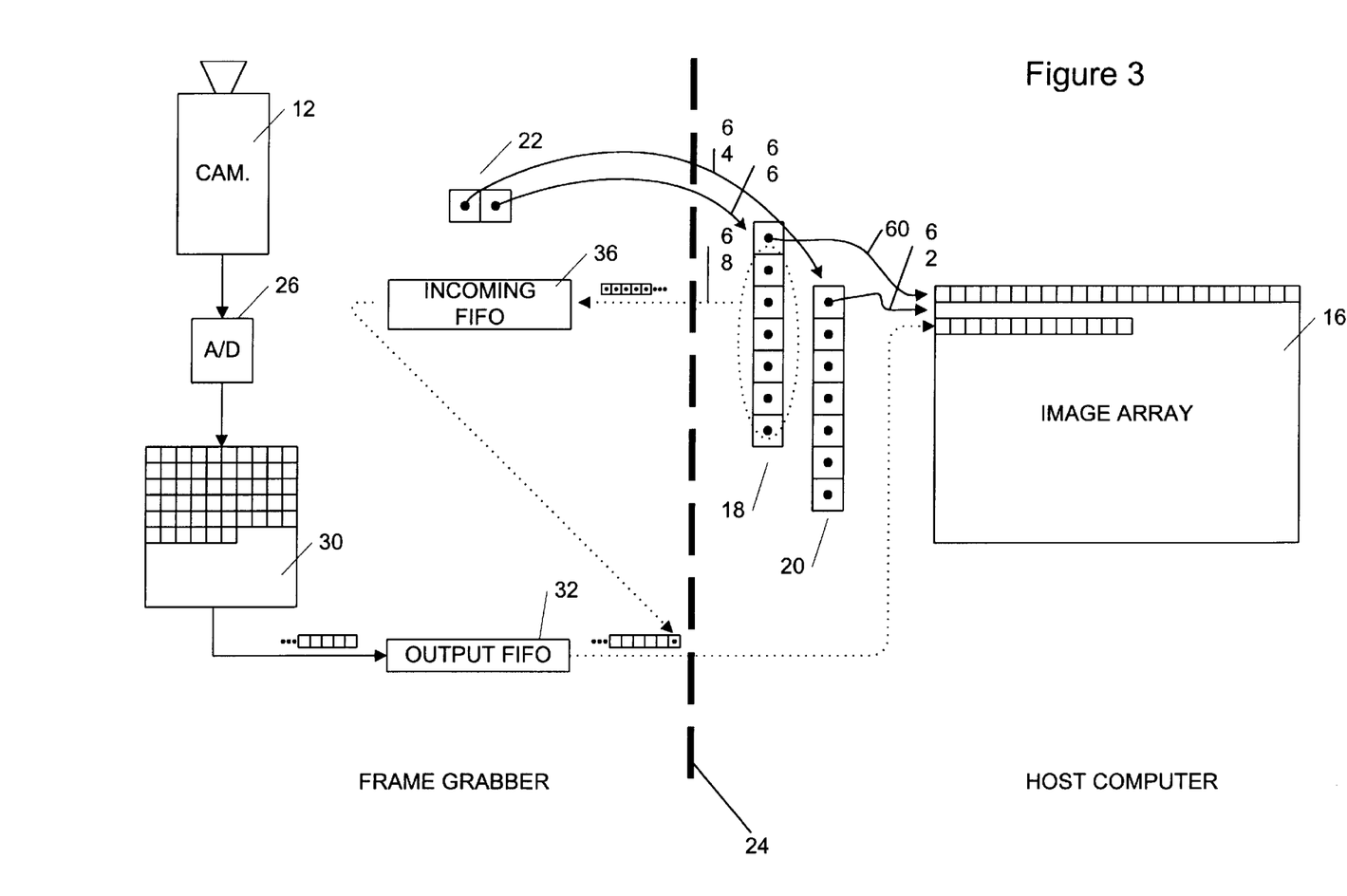
FIG. 3 depicts a Functional relationship among data structures used in the practice of the invention.

FIG. 2 depicts a method of operation of the image acquisition system of FIG. 1. In step 38, an applications program executing on the host system creates an image array 16 in the host memory 14 sized for the image being acquired. The application also allocates space for two tables of row address pointers 18, 20. The tables are loaded with physical addresses of each row in the image array 16. More particularly, table 18 is loaded with physical addresses for the starting location in each odd-numbered row of array 16, followed by the physical addresses for the starting location of each even-numbered row in the array 16. Conversely, table 20 is loaded with the starting location for all of the even-numbered rows, followed by those for all of the odd-numbered rows. These relationships are graphically depicted by lines 60, 62 in FIG. 3.

In step 40, the applications program transfers pointers 22 to the tables 18, 20 to the frame grabber's bus mastering PCI interface 34. This is illustrated by lines 64, 66 in FIG. 3.

In step 42, the applications program issues a command to the frame grabber 10 to begin acquisition of an image.

Image acquisition begins at the start of the next available field in the stream of pixels received from the camera 12. In step 44, the frame grabber determines the identity of that next available field. Using a pointer from structure 22, the timing circuit 28 commands the PCI interface 34 to initiate transfer of the appropriate row address table 18, 20 to incoming FIFO 36. See step 46. Thus, for example, if the incoming field in the stream is field zero, the timing circuit 28 commands the interface 34 to initiate transfer of table 18.

The interface 34 responds to that command by initiating a DMA transfer from host memory 14 and, particularly, from the selected table 18,20. In the illustrated embodiment, incoming FIFO 36 is eight double-words deep, which is not sufficient to contain the entire table 18, 20. This requires the PCI Interface 34 to continue to transfer row table data as space becomes available in the incoming FIFO 36. Once the transfer is initiated, it will continue, under control of the PCI Interface 34, until the selected row table 18,20 has been transferred. This is illustrated by dashed line 68 of FIG. 3.

In steps 48 and 50, the timing circuit 28 reads the address of the first (or subsequent) row from the incoming FIFO 36 and commands the PCI Interface 34 to initiate a DMA transfer of the first (or subsequent) row of image data from the outgoing FIFO 32 to that address in host memory 14. This is illustrated by dashed line 70 in FIG. 3. Once initiated, this transfer will continue under control of the PCI interface 34 until the row is completely transferred.

In step 52, the timing circuit 28 then begins transferring image data from the A/D converter 26 to the image memory 30 as it is available. This data is, of course, derived from the analog video signal provided by the camera 12 connected to the A/D converter 26.

The data rate of the incoming video is rather slow. This allows the timing circuit 28 to insert reads between writes to the image memory 30. These reads are used to read image data that was placed image memory 30 previously and to send it to the outgoing FIFO 32. This is done by using two counters (not shown) in the timing circuit 28. The incoming counter keeps track of which pixel is currently being acquired from the A/D while the outgoing counter keeps track of which pixel is being transferred to the Outgoing FIFO. The outgoing counter must always be behind the incoming counter. Since one read may generally be performed for every write to the image memory 30, the outgoing counter keeps up with the incoming counter. In cases when the outgoing FIFO 32 fills up and the outgoing counter must wait and not transfer data to the FIFO, it will fall behind. This is not a difficulty because it will 'catch up' during horizontal blanking of the video, when no data is being acquired from the A/D. Since the image memory 30 is large enough to hold the entire image, no data will be lost regardless of how far the outgoing counter might fall behind. This process will continue until the first row is completely transferred to host system memory. See step 54.

When the first row is complete, the PCI interface 34 will signal the timing circuit 28 and the process (steps 48–54) will repeat for the next and all subsequent rows of the image until the row table is empty. See step 56. When the row table becomes empty (image transfer is complete), the PCI interface 34 signals and interrupt to the host system and prepares for the next acquisition command from the host, starting again at step 42.

Described herein are methods and apparatus that meet the objects set forth above. It will be appreciated that the embodiments shown in the drawings and discussed in the previous section are merely examples and that other embodiments incorporating modifications thereto fall within the scope of the invention. Thus, for example, the pixels received from the video camera can be transferred to the host memory in groupings other than rows. In view of the foregoing,

What we claim is:

1. A system for forming an image from a stream of non-interleaved rows of pixels, the system comprising
   A. a host device that includes a host memory having a plurality of addressable storage locations in which the image is to be stored, the host device specifying respective locations of the host memory into which successive rows received from the stream are to be stored,
   B. image acquisition logic that is coupled to the host device, the image acquisition logic including a controller for at least initiating a plurality of memory transfers, each memory transfer for storing a respective row of pixels in a respective location in the memory specified by the host device, and
   C. the controller initiating the transfers such that
      (i) the rows of pixels are transferred to the host memory substantially in an order in which they are received from the stream, and
      (ii) the rows of pixels are transferred substantially directly to locations in the host memory corresponding to relative positions of those rows in the image.

2. A system according to claim 1 wherein the controllers transfers rows of pixels to respective locations in the host memory by direct memory access (DMA) transfers.

3. A system according to claim 2, wherein the controller initiates each memory transfer by issuing an instruction to transfer a row of pixels to a specified location in the memory.

4. A system according to claim 3, wherein the host comprises a table specifying respective locations in the host memory to which successive rows received from the stream are to be stored.

5. A system according to claim 1, in which the stream comprises successive fields, each including a plurality of respective rows of pixels of the image.

6. A system according to claim 5, in which the stream comprises two fields, a first field including rows of pixels for odd rows in the image, a second field including rows of pixels for even rows in the image.

7. A system according to claim 6, wherein the controller responds to receipt of the first field for initiating memory transfers for transferring the rows of pixels therein to locations in the host memory corresponding to odd rows in the image.

8. A system according to any of claims 6 and 7, wherein the controller responds to receipt of the second field in the stream for initiating memory transfers for transferring the rows of pixels therein to locations in the host memory corresponding to even rows in the image.

9. In an image acquisition system, the improvement for forming an image received as a stream of non-interleaved rows of pixels, comprising
   A. a host device comprising a first memory having a plurality of addressable storage locations in which the image is to be stored, the host device specifying respective locations of the host memory into which successive rows received from the stream are to be stored,
   B. image acquisition logic coupled to the host device, the image acquisition logic including a second memory for storing pixels substantially in an order they are received from the stream,
   C. a bus coupled to the first and second memories for carrying pixels therebetween,
   D. the image acquisition including a controller for at least initiating a plurality of memory transfers over the bus, each transfer moving a pixels from the second memory to a respective location in the first memory specified by the host device, such that
      (i) the pixels are transferred from the second memory to the first memory substantially in an order in which the pixels are received from the stream of non-interleaved rows of pixels, and
      (ii) the pixels are transferred substantially directly to locations in the first memory corresponding to their relative positions in the image.

10. A system according to claim 9, wherein the pixels are transferred from the second memory to the first memory by direct memory access (DMA) transfer.

11. A system according to claim 10, wherein the controller initiates each memory transfer by issuing an instruction to transfer pixels from the second memory to a specified location in the first memory.

12. A system according to claim 11, wherein the controller issues DMA instructions for the transfer of a row of pixels at a time from the second memory to the first memory.

13. A system according to claim 12, comprising a table of pointers specifying respective locations in the first memory to which successive rows of are to be transferred from the second memory.

14. A system according to claim 13, wherein the image acquisition logic comprises a third memory, coupled to the controller, for storing at least one of the pointers from the table.

15. A system according to claim 14, wherein the pointers are transferred from the table to the third memory by DMA transfer.

16. A frame grabber for storing to an addressable memory in a host device an image received by the frame grabber as a stream of non-interleaved rows of pixels, the frame grabber comprising:
   A. a first FIFO memory for at least temporarily storing pixels as they are received from the stream,
   B. a second FIFO memory for at least temporarily storing pointers specifying locations in the host device memory to which successive rows of pixels are to be transferred from the first FIFO memory,
   C. a controller, coupled to the first and second FIFO memories, for at least initiating a plurality of memory transfers from the first FIFO memory to locations in the host device memory specified by successive pointers in the second FIFO memory,
   D. the controller initiating the transfers such that:
      (i) the pixels are transferred from the first FIFO memory to the host device memory in an order in which the pixels are received from the stream, and
      (ii) the pixels are transferred substantially directly to locations in the host device memory corresponding to their respective positions in the image.

17. A frame grabber according to claim 16, wherein the pointers are loaded into the second FIFO memory by DMA transfers.

18. A frame grabber according to claim 17, wherein the controller initiates DMA transfers from a table of pointers in the host device to the second FIFO memory.

19. A frame grabber according to claim 16, in which the stream comprises successive fields, each including a plurality of respective rows of pixels making up the image.

20. A frame grabber according to claim 19, in which the stream comprises a first field including rows of pixels for odd rows in the image, and a second field including rows of pixels for even rows in the image.

21. A frame grabber according to claim 20, wherein the controller responds to receipt from the stream of the first field for initiating memory transfers to locations in the host device memory corresponding to odd rows in the image.

22. A frame grabber according to any of claims 20 and 21, wherein the controller responds to receipt from the stream of the second field for initiating transfers to locations in the host device memory corresponding to even rows in the image.

23. A frame grabber according to claim 22, comprising a third memory for storing a first pointer to a table in the host device containing pointers to locations in the host device memory corresponding to successive odd rows of the image and, thereafter, to successive even rows in the image, and a second pointer to a table in the host computer containing pointers to locations in the host computer memory corresponding to successive even rows of the image and, thereafter, to successive odd rows in the image.

24. A frame grabber according to claim 23, wherein the controller responds to receipt from the stream of the first field for initiating a DMA transfer with the first pointer, thereby causing the second memory to be loaded with pointers from the first table.

25. A frame grabber according to claim 23, wherein the controller responds to receipt from the stream of the second field for initiating a DMA transfer with the second pointer and, thereby, to cause the second memory to be loaded with pointers from the second table.

26. A method for transferring an image from an image acquisition device to a host memory of a host device to which the image acquisition device is coupled, the image being represented by a stream of non-interleaved rows of pixels received by the image acquisition device, the method comprising the steps of
   specifying with the host device respective locations in the host memory into which successive rows received from the stream are to be stored,
   initiating with the image acquisition device a plurality of memory transfers, each memory transfer storing a respective row of pixels from the stream in a respective location specified by the host device in the host memory, such that
      (i) the rows of pixels are transferred substantially in an order in which they are received from the stream of non-interleaved rows of pixels, and
      (ii) the rows of pixels are transferred substantially directly to locations in host memory corresponding to their relative positions in the image.

27. A method according to claim 26, comprising transferring the rows of pixels from the stream to their respective locations in the host memory by direct memory access (DMA) transfer.

28. A method according to claim 27, comprising:
   A. loading a table in the host device with successive pointers to locations in the host memory to which successive respective rows received from the stream are to be transferred,
   B. wherein the initiating step comprising initiating each DMA transfer by issuing a DMA instruction to transfer a row of pixels to a location specified by a next successive pointer in the table.

29. A method according to claim 26, in which the stream comprises successive fields, each including a plurality of respective rows of pixels of the images.

30. A method according to claim 29, wherein the initiating step comprises

A. responding to receipt of a first field in the stream for initiating memory transfers to locations in the host memory beginning with a first set of rows in the images,
B. responding to receipt of a second field in the stream from initiating memory transfers to locations in the host memory beginning with a second set of rows in the images, and
C. where the first and second sets are substantially exclusive of one another.

31. A method according to claim 30, wherein the first set of rows in the image are odd-numbered rows and wherein the second set of rows in the image are even-numbered rows.

32. An image acquisition method for transferring an image received by an image acquisition device as a stream of non-interleaved rows of pixels to a host device to which the image acquisition device is coupled, the method comprising:
   A. storing in a first memory in the image acquisition device pixels substantially in an order that they are received from the stream of non-interleaved rows of pixels,
   B. specifying with the host device respective locations in the host memory into which successive rows received from the stream are to be stored,
   C. initiating a plurality of memory transfers, each memory transfer for moving a respective row of pixels from the first memory to a respective location specified by the host device in a second memory in the host, such that
      (i) the pixels are transferred from the first memory to the second memory substantially in an order that they are received from the stream of non-interleaved rows of pixels; and
      (ii) the pixels are transferred substantially directly to locations in the second memory corresponding to their respective locations in the image.

33. A method according to claim 32, comprising the steps of transferring the pixels from the first memory to the second memory by direct memory access (DMA) transfer.

34. A method according to claim 33, wherein the initiating step comprises initiating each DMA transfer by issuing an instruction to transfer pixels to a location specified by a next successive pointer in the table.

35. A method according to claim 34 wherein the initiating step comprises issuing the DMA instructions for the transfer of one row of the pixels at a time from the first memory to the second memory.

36. A method of operating a frame grabber for storing an image, received as a stream of non-interleaved rows of pixels, to a host computer, the method comprising the steps of:
   A. storing a first FIFO memory pixels substantially in an order which they are received from the stream,
   B. storing to a second FIFO memory pointers specifying locations in the host computer memory to which successive rows of pixels are to be transferred from the first FIFO memory,
   C. initiating a plurality of memory transfers from the first FIFO memory to locations in the host computer memory specified by successive pointers in the second FIFO memory, such that
      (i) the pixels are transferred from the first FIFO memory to the host computer memory substantially in an order in which they are received from the stream, (ii) the pixels are transferred substantially directly to locations in the host computer memory corresponding to their respective positions in the image.

37. A method according to claim 36, wherein the pointers are loaded into the second FIFO memory by DMA transfers.

38. A method according to claim 37, in which the stream comprises successive fields, each including a plurality of respective rows of pixels of the image.

39. A method according to claim 38, wherein the initiating step comprises

A. responding to receipt of a first field in the stream for initiating memory transfers to locations in the host computer memory corresponding to a first set of rows in the image, B. responding to receipt of a second field in the stream for initiating memory transfers to locations in the host computer memory to a second set of rows in the image, and C. wherein the first and second sets are substantially exclusive of one another.

40. A method according to claim 39, wherein the first set of rows in the image are odd rows and wherein the second set of rows in the image are even rows.

* * * * *